(12) United States Patent
Uto

(10) Patent No.: US 12,519,176 B2
(45) Date of Patent: Jan. 6, 2026

(54) ELECTROCHEMICAL CELL AND ELECTROCHEMICAL CELL STACK

(71) Applicant: KYOCERA Corporation, Kyoto (JP)

(72) Inventor: Yasuyuki Uto, Higashiosaka (JP)

(73) Assignee: KYOCERA CORPORATION, Kyoto (JP)

(*) Notice: Subject to any disclaimer, the term of this patent is extended or adjusted under 35 U.S.C. 154(b) by 226 days.

(21) Appl. No.: 16/760,017

(22) PCT Filed: Oct. 26, 2018

(86) PCT No.: PCT/JP2018/039857
§ 371 (c)(1),
(2) Date: Apr. 28, 2020

(87) PCT Pub. No.: WO2019/087956
PCT Pub. Date: May 9, 2019

(65) Prior Publication Data
US 2020/0350537 A1    Nov. 5, 2020

(30) Foreign Application Priority Data
Oct. 30, 2017   (JP) ................. 2017-209197

(51) Int. Cl.
*H01M 50/30* (2021.01)
*H01M 50/103* (2021.01)
(Continued)

(52) U.S. Cl.
CPC ......... *H01M 50/30* (2021.01); *H01M 50/103* (2021.01); *H01M 50/105* (2021.01);
(Continued)

(58) Field of Classification Search
CPC ............................................. H01M 50/10–598
See application file for complete search history.

(56) References Cited

U.S. PATENT DOCUMENTS 9,406,922 B2      8/2016  Ryu et al.
11,552,368 B2*   1/2023  Holman .............. H01M 50/578
(Continued)

FOREIGN PATENT DOCUMENTS

CN    104134770 A    11/2014
CN    104254934 A    12/2014
(Continued)

OTHER PUBLICATIONS

Espacenet machine translation of Taguchi et al., JP2010238860A. (Year: 2010).*

*Primary Examiner* — Haroon S. Sheikh
(74) *Attorney, Agent, or Firm* — HAUPTMAN HAM, LLP

(57) ABSTRACT

An electrochemical cell includes a power-generating element including a semi-solid positive electrode, a semi-solid negative electrode, a separator located between the semi-solid positive electrode and the semi-solid negative electrode, a positive-electrode current collector electrically connected to the semi-solid positive electrode, and a negative-electrode current collector electrically connected to the semi-solid negative electrode; and a packaging body which encases the power-generating element, the packaging body including single or plural holes which open on an inner side of the packaging body and an outer side of the packaging body.

17 Claims, 15 Drawing Sheets

(51) Int. Cl.
*H01M 50/105* (2021.01)
*H01M 50/209* (2021.01)
*H01M 50/211* (2021.01)
*H01M 50/46* (2021.01)
*H01M 50/55* (2021.01)
*H01M 50/553* (2021.01)

(52) U.S. Cl.
CPC ....... *H01M 50/209* (2021.01); *H01M 50/211* (2021.01); *H01M 50/46* (2021.01); *H01M 50/55* (2021.01); *H01M 50/553* (2021.01)

(56) References Cited

U.S. PATENT DOCUMENTS

| | | | |
|---|---|---|---|
| 2009/0053585 A1* | 2/2009 | Nakazawa | H01M 10/0468 429/120 |
| 2011/0123844 A1 | 5/2011 | Bhardwaj et al. | |
| 2012/0196161 A1* | 8/2012 | Yang | H01M 50/55 429/53 |
| 2015/0079436 A1 | 3/2015 | Chung et al. | |
| 2015/0380697 A1* | 12/2015 | Osborne | H01M 50/209 429/153 |
| 2016/0133916 A1 | 5/2016 | Zagars et al. | |
| 2016/0205663 A1 | 7/2016 | Shauh et al. | |
| 2018/0114964 A1 | 4/2018 | Kim et al. | |
| 2018/0233722 A1* | 8/2018 | Holman | H01M 50/578 |

FOREIGN PATENT DOCUMENTS

| | | |
|---|---|---|
| CN | 107112444 A | 8/2017 |
| JP | 200256835 A | 2/2002 |
| JP | 2010-238860 A | 10/2010 |
| JP | 2010-238861 A | 10/2010 |
| JP | 2011198742 A | 10/2011 |
| KR | 1020170027150 A | 3/2017 |
| WO | 2014010872 A1 | 1/2014 |

* cited by examiner

ELECTROCHEMICAL CELL AND ELECTROCHEMICAL CELL STACK

CROSS-REFERENCE TO RELATED APPLICATIONS

This application is a national stage entry according to 35 U.S.C. 371 of International Application No. PCT/JP2018/039857 filed on Oct. 26, 2018, which claims priority to Japanese Patent Application No. 2017-209197 filed on Oct. 30, 2017.

TECHNICAL FIELD

The present disclosure relates to an electrochemical cell and an electrochemical cell stack.

BACKGROUND

An electrochemical cell proposed in U.S. Patent Application Publication No. 2016/205663 (hereafter referred to as Patent Literature 1) is known as an example of an electrochemical cell using a semi-solid electrode. The electrochemical cell described in Patent Literature 1 includes: a power-generating element including a positive-electrode current collector, a positive electrode, a negative-electrode current collector, a negative electrode, and a separator disposed between the positive electrode and the negative electrode; and a pouch which receives therein the power-generating element.

SUMMARY

An electrochemical cell according to the disclosure includes a power-generating element including a semi-solid positive electrode, a semi-solid negative electrode, a separator located between the semi-solid positive electrode and the semi-solid negative electrode, a positive-electrode current collector electrically connected to the semi-solid positive electrode, and a negative-electrode current collector electrically connected to the semi-solid negative electrode; and a packaging body which encases the power-generating element, the packaging body including single or plural holes which open on an inner side of the packaging body and an outer side of the packaging body.

An electrochemical cell stack according to the disclosure includes a plurality of electrochemical cells.

DETAILED DESCRIPTION

Figure 1:
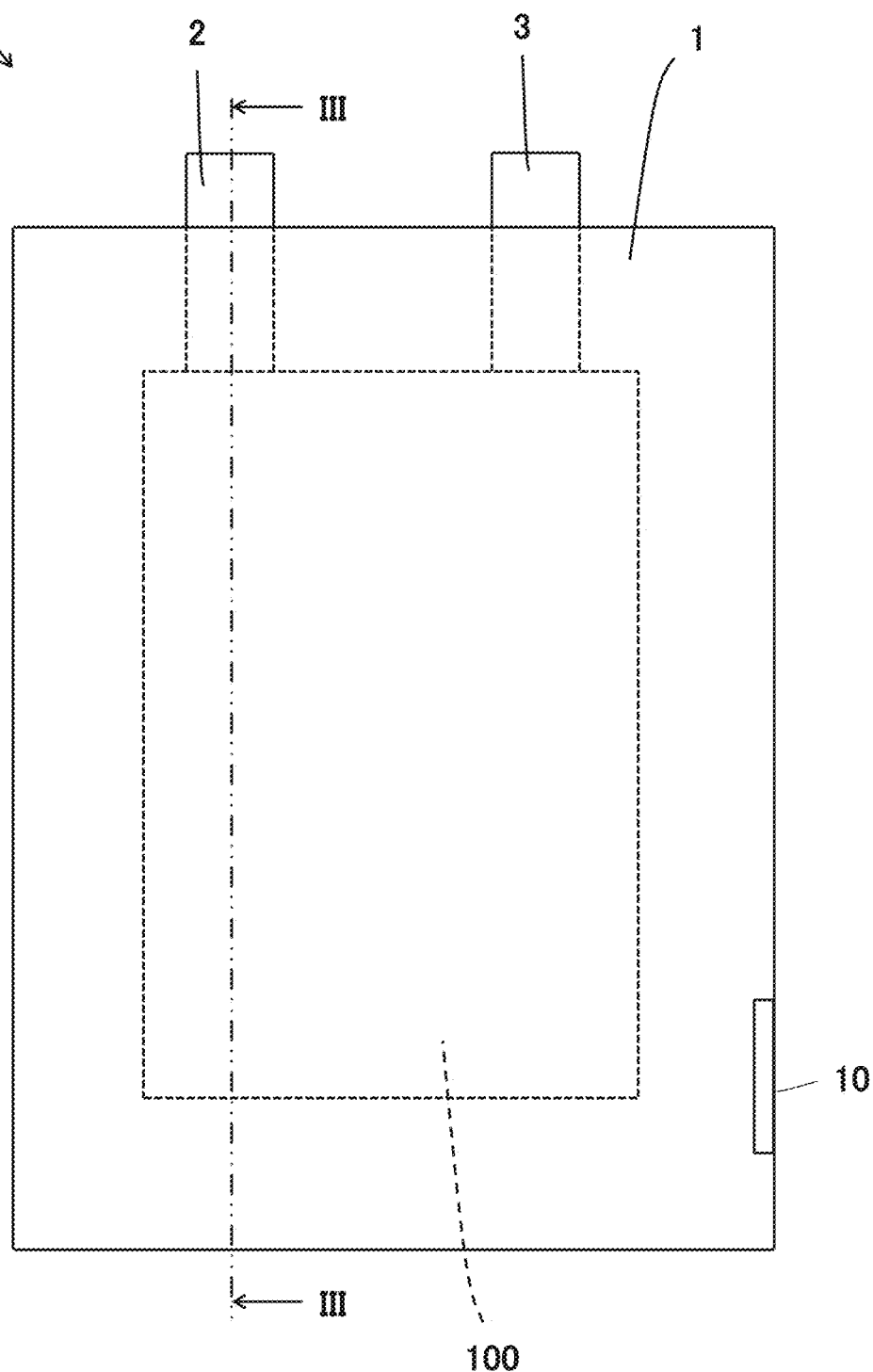
FIG. 1 is a top view of an example of an electrochemical cell, as seen from a positive electrode.
Figure 2:
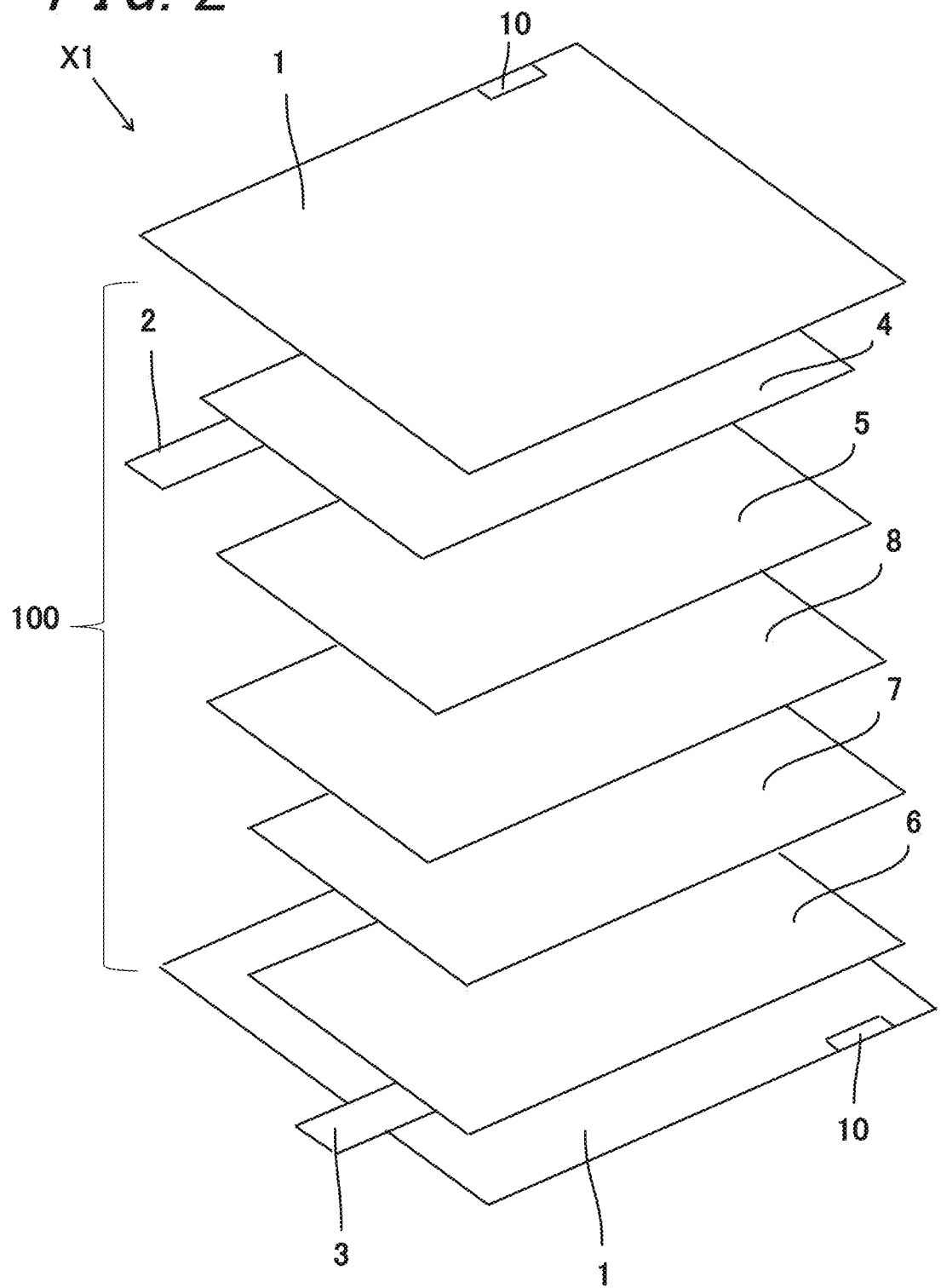
FIG. 2 is a schematic view showing stacked constituent components of the example of the electrochemical cell.
Figure 3:
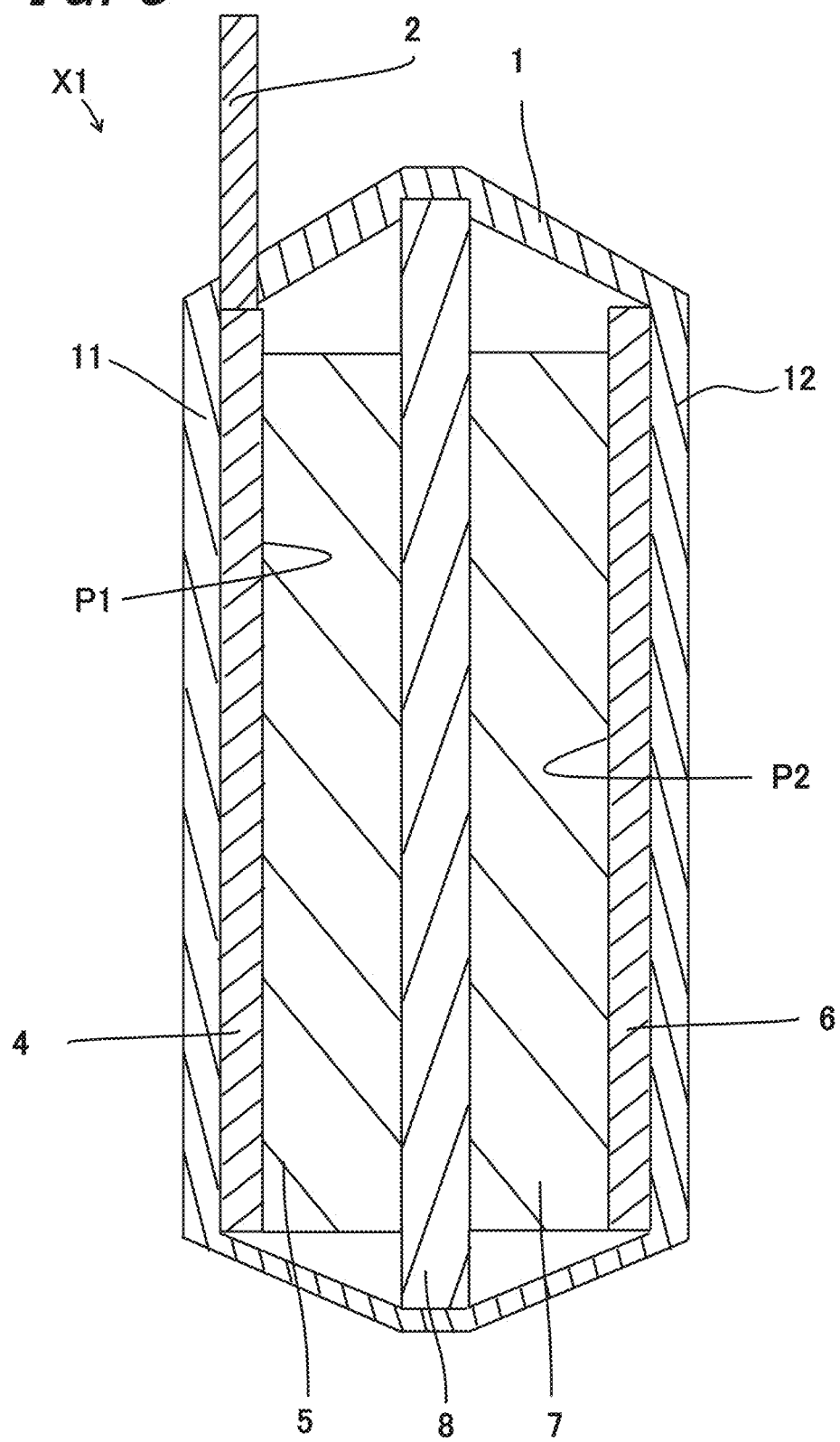
FIG. 3 is a sectional view taken along the line III-III in FIG. 1.

As shown in FIGS. 1 to 3, an electrochemical cell X1 includes: a power-generating element 100 including a positive-electrode terminal 2, a negative-electrode terminal 3, a positive-electrode current collector 4, a semi-solid positive electrode 5, a negative-electrode current collector 6, a semi-solid negative electrode 7, and a separator 8; and a packaging body 1 which encases the power-generating element 100.

As employed herein "semi-solid" refers to a liquid phase-solid phase mixture, such as a particulate suspension, a colloidal suspension, an emulsion, a gel, or a micelle, for example.

The packaging body 1 is a member for encasing the positive-electrode current collector 1 and the negative-electrode current collector 6. More specifically, the packaging body 1 receives therein part of the positive-electrode terminal 2, part of the negative-electrode terminal 3, the positive-electrode current collector 4, the positive electrode 5, the negative-electrode current collector 6, the negative electrode 7, and the separator 8. The packaging body 1 includes a hole 10 which opens on an inner side of the packaging body 1 and an outer side of the packaging body 1.

The packaging body 1 has a three-layer structure, for example. For example, the three-layer structure includes an external layer, an internal layer, and an intermediate layer sandwiched between the external layer and the internal layer. The internal layer makes contact with the positive-electrode current collector 4 and the negative-electrode current collector 6. This can improve the strength of the packaging body 1.

For example, the external layer of the packaging body 1 may contain an insulating material. The external layer of the packaging body 1 may include a polymer film made of, for example, polyethylene terephthalate (PET), polybutylene terephthalate (PBT), nylon, high-purity polyethylene (HDPE), oriented polypropylene (o-PP), polyvinyl chloride (PVC), polyimide (PI), or polysulfone (PSU). Alternatively, the external layer of the packaging body 1 may contain a combination of such materials as described above, for example. Moreover, the external layer of the packaging body 1 may be coated with a combustion inhibitor, such as flame-retardant PET.

For example, the intermediate layer of the packaging body 1 may contain a metal material. The intermediate layer of the packaging body 1 may include a metallic layer (e.g. metallic foil, a metallic substrate, or a metallic film) made of, for example, aluminum (Al), copper (Cu), or stainless steel (SUS). Alternatively, the intermediate layer of the packaging body 1 may include a metallic layer made of an alloy of such metals as described above, or a metallic layer made of a combination of such metals as described above.

For example, the internal layer of the packaging body 1 may contain an insulating material. The internal layer of the packaging body 1 may include a polymer film made of, for example, cast polypropylene (c-PP), polyethylene (PE), ethylene vinyl acetate (EVA), PET, polyvinyl acetate (PVA), polyamide (PA), an acrylic adhesive, an ultraviolet (UV)-curable resin, an electron beam (EB)-curable resin, or an infrared (IR)-curable resin. Alternatively, the internal layer of the packaging body 1 may include a combination of polymer films of different materials as described above.

The internal layer of the packaging body 1 may additionally contain a flame-retardant material, for example. The internal layer of the packaging body 1 may contain, for example, polyether ether ketone (PEEK), polyethylene naphthalate (PEN), polyether sulfone (PES), PI, polyethylene sulfide (PPS), or polyethylene oxide (PPO). The internal layer of the packaging body 1 may include a combination of flame-retardant films of different materials as described above.

The packaging body 1 may have a two-layer structure, for example. For example, the two-layer structure includes an external layer and an internal layer. The external layer may include a polymer film made of, for example, PET or PBT. The internal layer may include a polymer film made of, for example, PP or PE.

The packaging body 1 may have a single-layer structure, for example. For example, the single-layer structure may contain polypropylene or polyolefin.

In order to reduce the risk of catching fire, the single-layer structure of the packaging body 1 may be made of a combustion-inhibiting substance.

The positive-electrode current collector 4 transfers and receives electrons to and from the positive electrode 5. The positive-electrode current collector 4 includes a first plane P1. The first plane P1 of the positive-electrode current collector 4 is electrically connected to the positive electrode 5. A plane of the positive-electrode current collector 4 opposite to the first plane P1 is connected to the packaging body 1. For example, the positive-electrode current collector 4 may be shaped in a sheet or mesh. The positive-electrode current collector 4 contains a metal material, for example. The positive-electrode current collector 4 may contain, for example, stainless steel, nickel, a nickel-chromium alloy, aluminum, titanium, copper, lead, a lead alloy, a refractory metal, or a precious metal. Moreover, the metal material constituting the positive-electrode current collector 4 may be coated with an electrically conductive material. For example, a metal, a metallic oxide, or carbon may be used as the conductive material. For example, Pt, Au, or Ni may be used as the metal adopted as the conductive material. For example, vanadium oxide may be used as the metallic oxide adopted as the conductive material. For example, the positive-electrode current collector 4 measures 1 to 40 μm in thickness.

The negative-electrode current collector 6 transfers and receives electrons to and from the negative electrode 7. The negative-electrode current collector 6 includes a second plane P2. The second plane P2 of the negative-electrode current collector 6 is electrically connected to the negative electrode 7. The plane of the negative-electrode current collector 6 opposite to the second plane P2 is connected to the packaging body 1. For example, the negative-electrode current collector 6 may be shaped in a sheet or mesh. The negative-electrode current collector 6 contains a metal, for example. The negative-electrode current collector 6 may contain, for example, stainless steel, nickel, a nickel-chromium alloy, titanium, lead oxide, or a precious metal. For example, the negative-electrode current collector 6 measures 1 to 20 μm in thickness.

The semi-solid positive electrode 5 receives electrons from the positive-electrode current collector 4 during discharging process. The positive electrode 5 releases electrons to the positive-electrode current collector 4 during charging process. The positive electrode 5 is electrically connected to the first plane P1 of the positive-electrode current collector 4.

The semi-solid negative electrode 7 releases electrons to the negative-electrode current collector 6 during discharging process. The negative electrode 7 receives electrons from the negative-electrode current collector 6 during charging process. The negative electrode 7 is electrically connected to the second plane P2 of the negative-electrode current collector 6.

The positive electrode 5 and the negative electrode 7 are each an electrochemically active semi-solid member. For example, the positive electrode 5 and the negative electrode 7 may contain an active material and an electrolyte. For example, a solvent or solvent mixture with salt added may be used as the electrolyte. The positive electrode 5 and the negative electrode 7 may contain an additive. For example, the positive electrode 5 and the negative electrode 7 may contain an active material, a composition, and a semi-solid suspension as described in U.S. Provisional Patent Application No. 61/787,382 entitled "Semi-Solid Electrodes Having High Rate Capability" and U.S. Provisional Patent Application No. 61/787,372 entitled "Asymmetric Battery Having a Semi-Solid Cathode and High Energy Density Anode".

For example, the positive electrode 5 and the negative electrode 7 each measure 250 to 2000 μm in thickness.

The separator 8 is disposed between the positive electrode 5 and the negative electrode 7 and divides the power-generating element 100 into a positive electrode 5-side portion and a negative electrode 7-side portion. The separator 8 reduces the possibility of short-circuiting within the power-generating element 100. The separator 8 includes an insulator. The separator 8 may contain, for example, a ductile and elastic polymer. More specifically, the separator 8 may contain, for example, polyolefin, polyvinyl chloride, nylon, fluorocarbon, or polystyrene.

The hole 10 allows gas generated by side reaction occurring in charging and discharging process to escape out of the packaging body 1. For example, the hole 10 may be given a rectangular shape including long sides and short sides, as seen in a direction perpendicular to the first plane P1 of the positive-electrode current collector 4. In this case, for example, the hole 10 is placed so that the long side thereof extends along the end of the packaging body 1. The hole 10 may be obtained by cutting away part of the packaging body 1. The hole 10 may also be obtained by forming a cutout in part of the packaging body 1. For example, the hole 10 measures 0.1 to 10 mm in transverse length, and 10 to 30 mm in longitudinal length.

As shown in FIGS. 1 to 3, in the electrochemical cell X1 as exemplified in the disclosure, the packaging body 1 includes the hole 10 which opens on an inner side of the packaging body 1 and an outer side of the packaging body 1.

Thus, the gas generated within the packaging body 1 can be discharged out of the packaging body 1, in consequence whereof there results little gas buildup between the positive-electrode current collector 4 and the positive electrode 5, between the negative-electrode current collector 6 and the negative electrode 7, and between the positive electrode 5 and the separator 8, or between the negative electrode 7 and the separator 8. This reduces a decline in efficiency in main reaction occurring in charging and discharging process, and thus reduces a decrease in battery capacity.

Moreover, as shown in FIG. 3, the packaging body 1 includes a first packaging portion 11 for covering the positive-electrode current collector 4, and a second packaging portion 12 for covering the negative-electrode current collector 6. As shown in FIG. 2, the hole 10 may be positioned in each of the first packaging portion 11 and the second packaging portion 12. In this case, while gas is generated within the packaging body 1, a part of the gas from the positive electrode 5 and a part of the gas from the negative electrode 7 are each able to escape through the corresponding one of the holes 10, in consequence whereof there results little gas buildup between the positive-electrode current collector 4 and the positive electrode 5, between the negative-electrode current collector 6 and the negative electrode 7, and between the positive electrode 5 and the separator 8, or between the negative electrode 7 and the separator 8. This reduces a decline in efficiency in main reaction occurring in charging and discharging process. Thus, this can reduce a decrease in battery capacity.

The following are examples of how the hole 10 is to be positioned. That is, the hole 10 may be placed so that the long side thereof extends along one side of the outer periphery of the first packaging portion 11, as seen in a direction perpendicular to the first plane P1 of the positive-electrode current collector 4. Moreover, the hole 10 may be placed so that the long side thereof extends along one side of the outer periphery of the second packaging portion 12, as seen in a direction perpendicular to the second plane P2 of the negative-electrode current collector 6.

Figure 4:
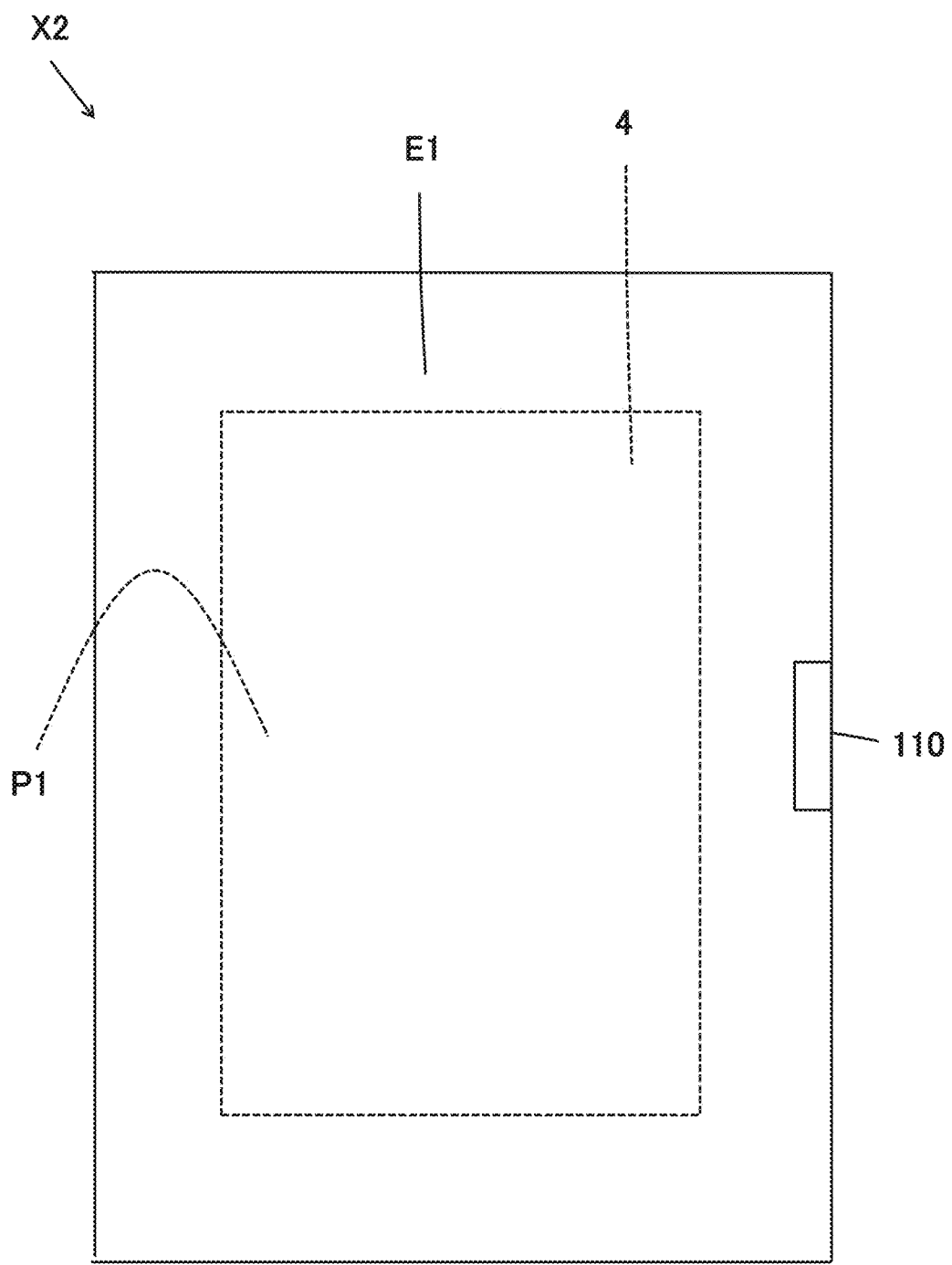
FIG. 4 is a top view of another example of the electrochemical cell, with terminals omitted, as seen from the positive electrode.

As shown in FIG. 4, in an electrochemical cell X2, the positive-electrode current collector 4 includes a first plane P1 opposed to the positive electrode 5. In this construction, the packaging body 1 includes a first region E1 which does not overlap with the positive-electrode current collector 4, as seen in a direction perpendicular to the first plane P1. More specifically, the positive-electrode current collector 4 may be given a quadrangular shape, and the packaging body 1 may be given a rectangular shape which is larger than the positive-electrode current collector 4, as seen in a direction perpendicular to the first plane P1.

The term "quadrangular shape" may be construed as encompassing a rounded quadrangle. Moreover, the term "rectangular shape" may be construed as encompassing a rounded rectangle.

A hole 110 is positioned in the first region E1. This can facilitate an escape of gas generated at the positive electrode 5. That is, if the hole 110 is positioned in a region which overlaps with the positive electrode 5, the gas generated at the positive electrode 5 will travel to the first region E1 first, then travel from the first region E1 to the region which overlaps with the positive electrode 5, and will eventually go out through the hole 110. In contrast, with the hole 110 positioned in the first region E1, the gas generated at the positive electrode 5 travels to the first region E1, and immediately afterwards goes out through the hole 110. In fact, the positioning of the hole 110 in the first region E1 can achieve smooth escape of the gas generated at the positive electrode 5 through the hole 110.

For example, the hole 110 may lie in the bisector passing through the quadrangular positive-electrode current collector 4. As employed herein "the bisector passing through the positive-electrode current collector 4" refers to a straight line passing through the midpoint of each of the two opposed sides of the positive-electrode current collector 4.

Figure 5:
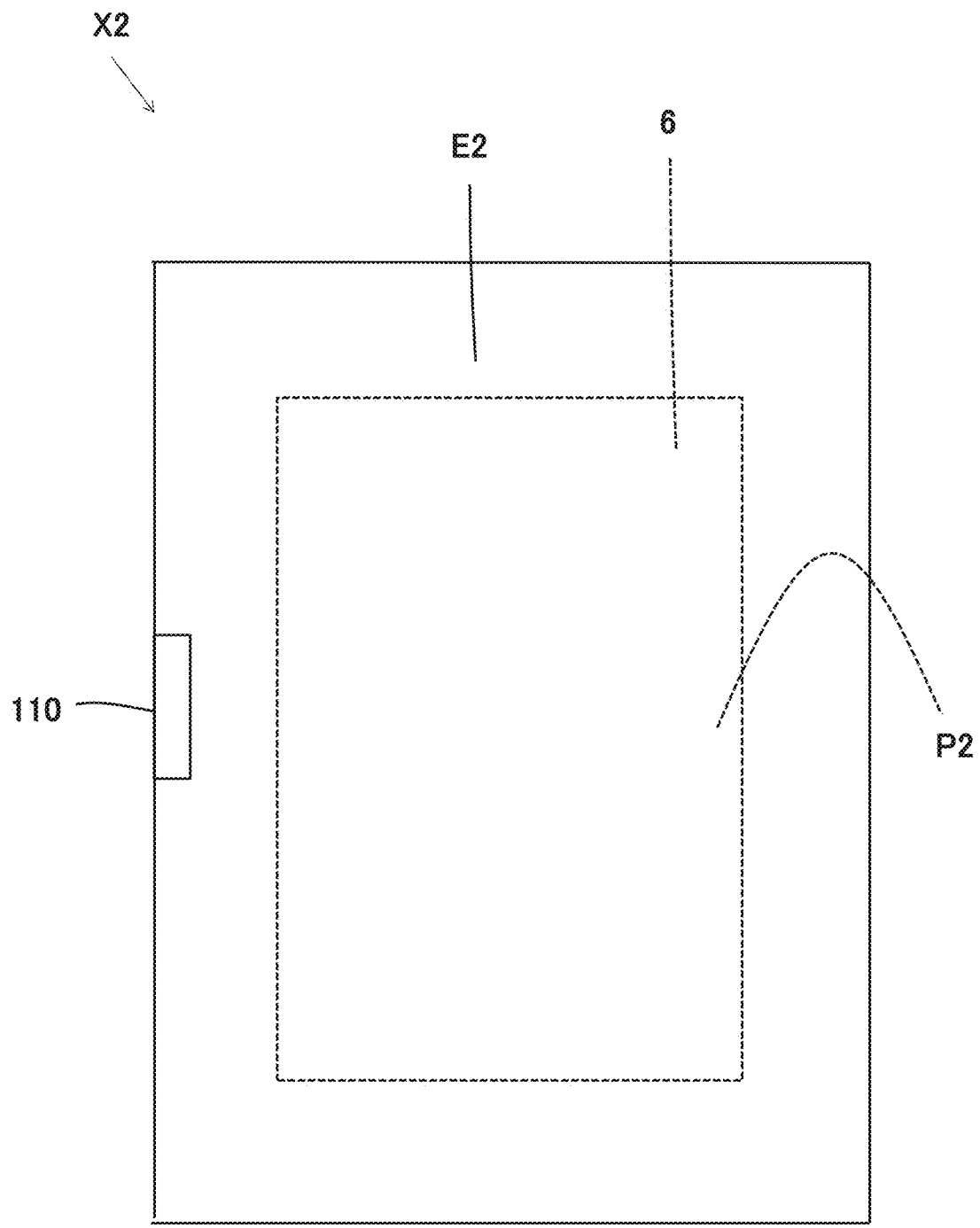
FIG. 5 is a top view of the example of the electrochemical cell, with terminals omitted, as seen from a negative electrode.

As shown in FIG. 5, in the electrochemical cell X2, the negative-electrode current collector 6 includes a second plane P2 opposed to the negative electrode 7. The packaging body 1 includes a second region E2 which does not overlap with the negative-electrode current collector 6, as seen in a direction perpendicular to the second plane P2. More specifically, the negative-electrode current collector 6 may be quadrangular shaped, and the packaging body 1 may be given a rectangular shape which is larger than the negative-electrode current collector 6, as seen in a direction perpendicular to the second plane P2.

A hole 110 is positioned in the second region E2. This can facilitate an escape of gas generated at the negative electrode 6. That is, if the hole 110 is positioned in a region which overlaps with the negative electrode 6, the gas generated at the negative electrode 6 will travel to the second region E2 first, then travel from the second region E2 to the region which overlaps with the negative electrode 6, and will eventually go out through the hole 110. In contrast, with the hole 110 positioned in the second region E2, the gas generated at the negative electrode 6 travels to the second region E2, and immediately afterwards goes out through the hole 110. In fact, the positioning of the hole 110 in the second region E2 can achieve smooth escape of the gas generated at the negative electrode 6 through the hole 110.

For example, the hole 110 may lie in the bisector passing through the negative-electrode current collector 6. As employed herein "the bisector passing through the negative-electrode current collector 6" refers to a straight line passing through the midpoint of each of the two opposed sides of the negative-electrode current collector 6.

Figure 6:
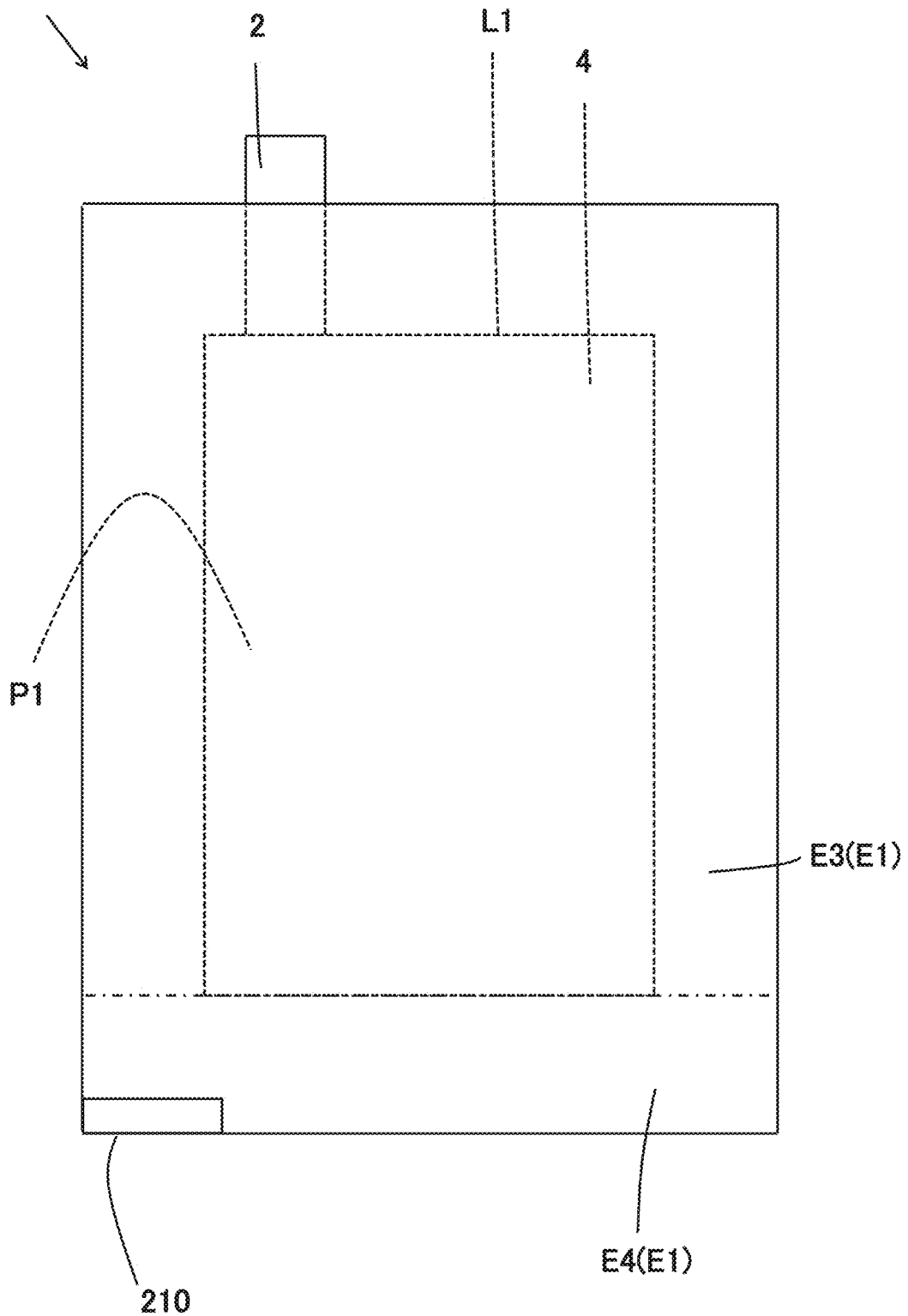
FIG. 6 is a top view of still another example of the electrochemical cell, as seen from the positive electrode.
Figure 7:
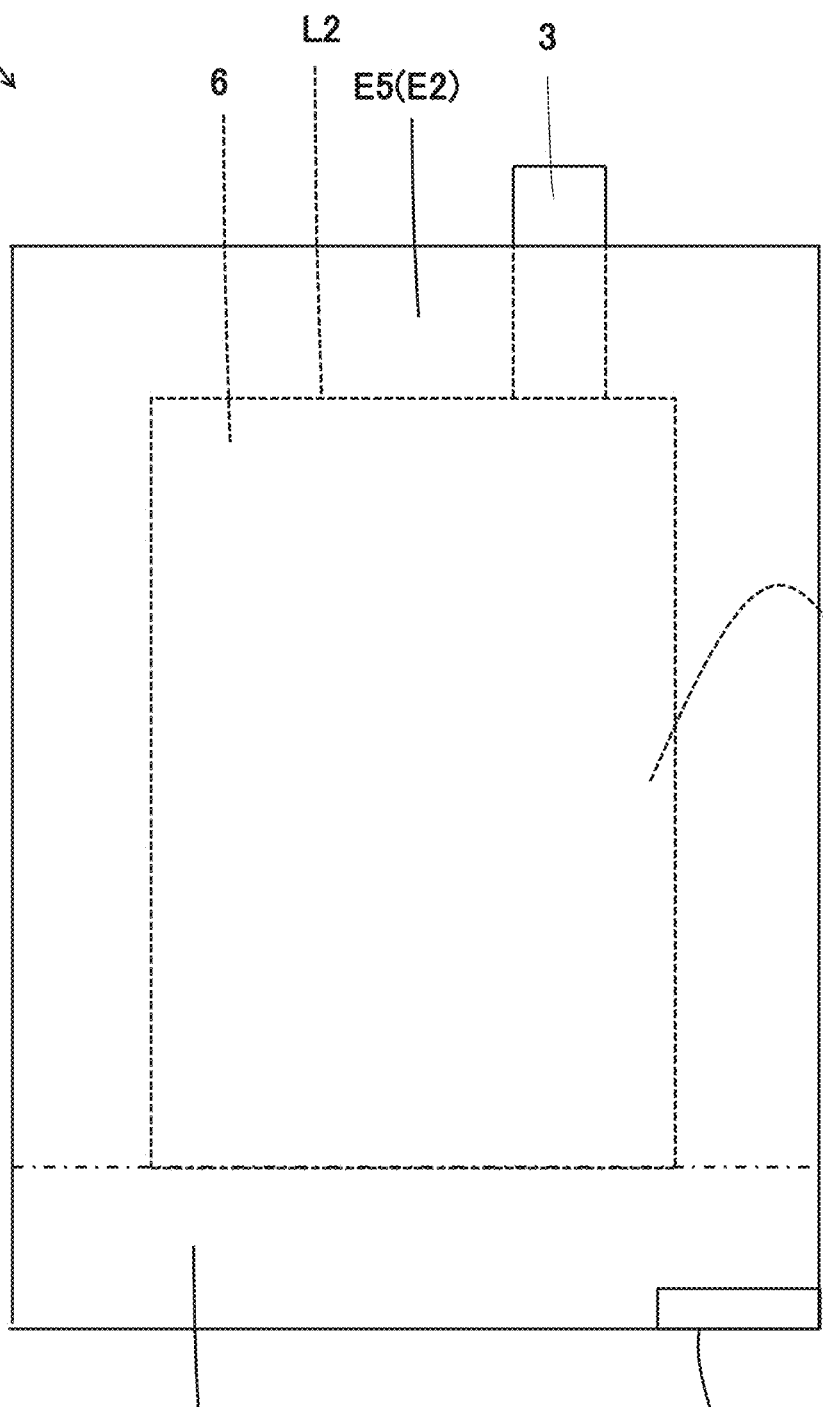
FIG. 7 is a top view of the example of the electrochemical cell, as seen from the negative electrode.

As shown in FIGS. 6 and 7, an electrochemical cell X3 additionally includes a positive-electrode terminal 2 and a negative-electrode terminal 3.

In this construction, for example, as shown in FIG. 6, the positive-electrode current collector 4 may be given a quadrangular shape including a first side L1, as seen in a direction perpendicular to the first plane P1. The packaging body 1 may be given a rectangular shape which is larger than the positive-electrode current collector 4.

The positive-electrode terminal 2 includes a first end and a second end. The first end of the positive-electrode terminal 2 is connected to the first side L1 of the positive-electrode current collector 5 within the packaging body 1. The positive-electrode terminal 2 provides electrical connection between the electrochemical cell X3 and an external apparatus. For example, the positive-electrode terminal 2 may be made of the same material as that used for the positive-electrode current collector 4. Alternatively, the positive-electrode terminal 2 may be made of a material which is different from that used for the positive-electrode current collector 4. The positive-electrode terminal 2, when it differs in material from the positive-electrode current collector 4, may contain a metal material. For example, copper, nickel, or gold may be used as the metal material.

Figure 8:
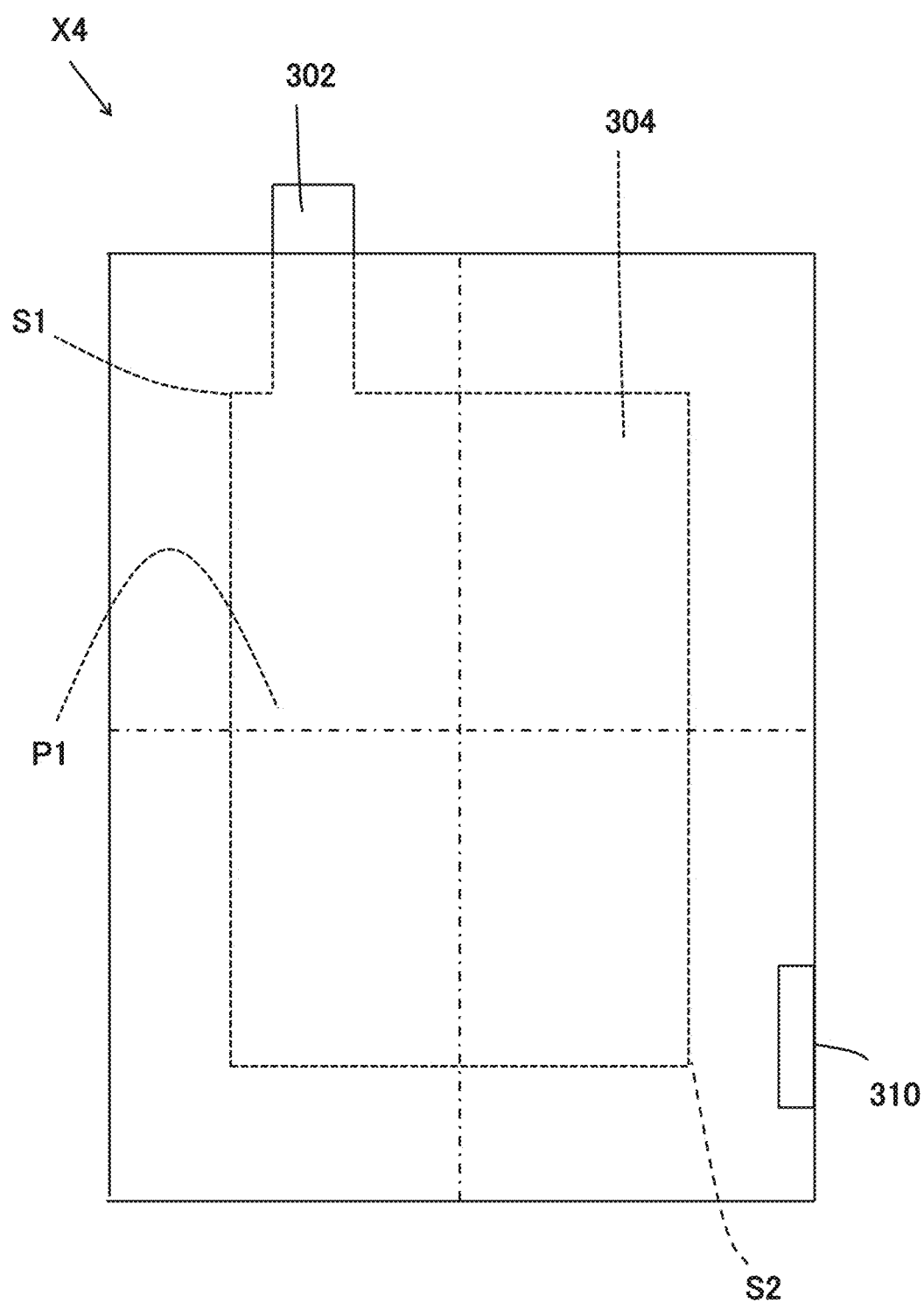
FIG. 8 is a top view of still another example of the electrochemical cell, as seen from the positive electrode.
Figure 9:
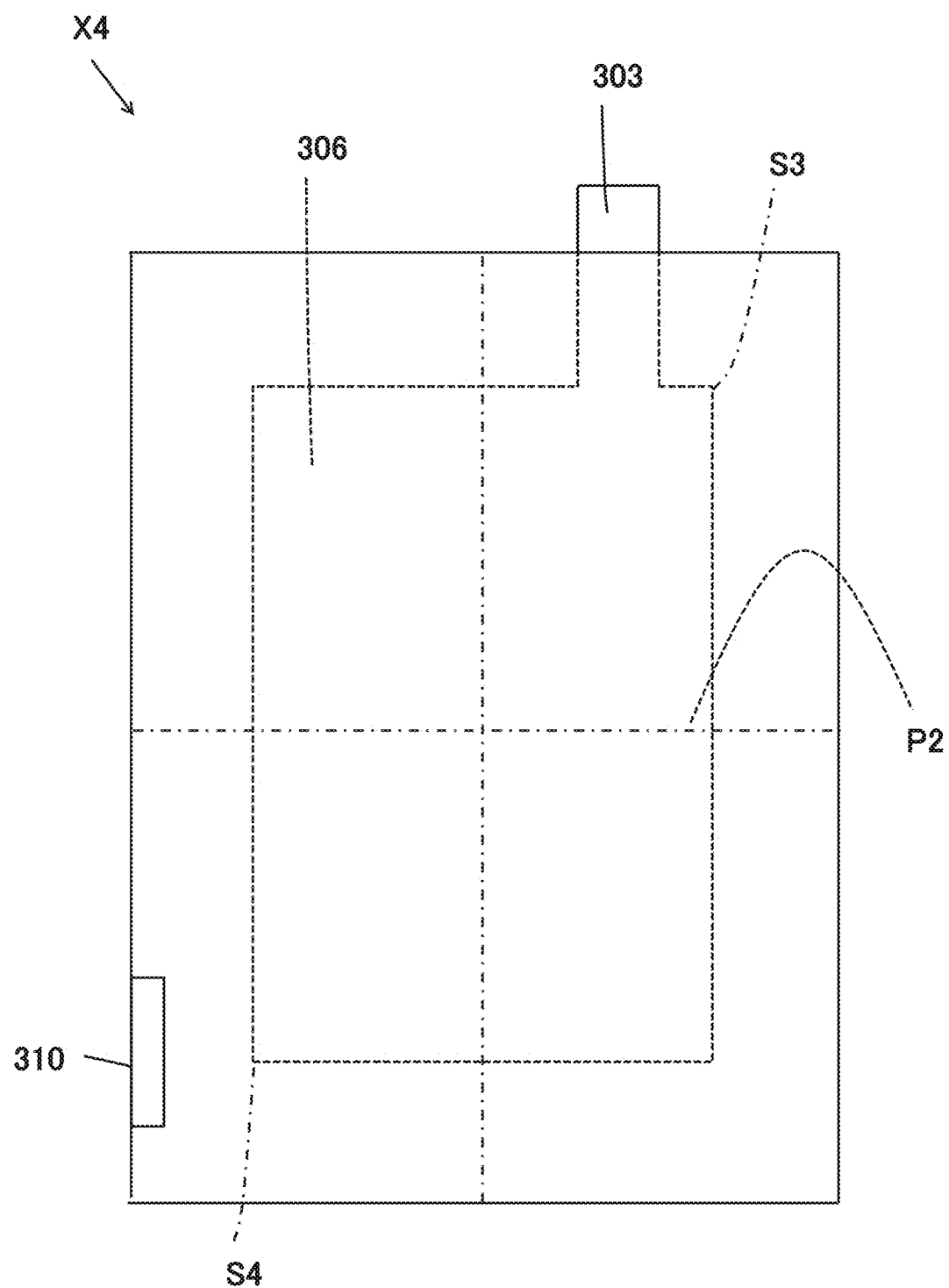
FIG. 9 is a top view of the example of the electrochemical cell, as seen from the negative electrode.

Moreover, as shown in FIG. 8, a positive-electrode terminal 302 and the positive-electrode current collector 4 may be formed as a single member. In other words, the positive-electrode current collector 4 and the positive-electrode terminal 302 may be included in a single member. Moreover, as shown in FIG. 9, a negative-electrode terminal 303 and the negative-electrode current collector 6 may be formed as a single member. In other words, the negative-electrode current collector 6 and the positive-electrode terminal 303 may be included in a single member. For example, the positive-electrode terminal 2 may be rectangular shaped. In this case, one of the short sides of the positive-electrode terminal 2 may overlap with the first side L1 of the positive-electrode current collector 4.

For example, as shown in FIG. 7, the negative-electrode current collector 6 may be given a quadrangular shape including a second side L2, as seen in a direction perpendicular to the second plane P2. The packaging body 1 may be given a rectangular shape which is larger than the negative-electrode current collector 6.

The negative-electrode terminal 3 includes a first end and a second end. The first end of the negative-electrode terminal 3 is connected to the second side L2 of the negative-electrode current collector 6 within the packaging body 1. The negative-electrode terminal 3 provides electrical connection between the electrochemical cell X3 and an external apparatus. For example, the negative-electrode terminal 3 may be made of the same material as that used for the negative-electrode current collector 6. Alternatively, the negative-electrode terminal 3 may be made of a material which is different from that used for the negative-electrode current collector 6. The negative-electrode terminal 3, when it differs in material from the negative-electrode current collector 6, may contain a metal material. For example, aluminum, nickel, or gold may be used as the metal material. For example, the negative-electrode terminal 3 may be rectangular shaped. In this case, one of the short sides of the negative-electrode terminal 3 may overlap with the second side L2 of the negative-electrode current collector 6.

As shown in FIG. 6, in the electrochemical cell X3, the first region E1 includes a third region E3 and a fourth region E4. Given that the first region E1 is divided into two subregions by a straight line extending from a side opposite to the first side L1 of the positive-electrode current collector 4, the third region E3 corresponds to one of the subregions from which the positive-electrode terminal 2 is exposed, and, the fourth region E4 corresponds to the other subregion which is an area of the first region E1 exclusive of the third region E3.

A hole 210 is positioned in the fourth region E4. For example, the hole 210 may be positioned at a corner of the fourth region E4 of the packaging body 1. As employed herein "positioning of the hole at a corner" refers to an absence of a corner resulting from the placement of the hole 210. The term "absence of a corner" encompasses, in addition to the removal of an originally existing corner of the packaging body 1, the packaging body 1 is free of any corners. This arrangement can increase the distance between the hole 210 and the positive-electrode terminal 2. Thus, this can reduce the tendency of the positive-electrode terminal 2 to short-circuit against the negative electrode 7 via the hole 210.

Moreover, as shown in FIG. 7, in the electrochemical cell X3, the second region E2 includes a fifth region E5 and a sixth region E6. Given that the second region E2 is divided into two subregions by a straight line extending from a side opposite to the second side L2 of the negative-electrode current collector 6, the fifth region E5 corresponds to that one of the subregions from which the negative-electrode terminal 3 is exposed, and, the sixth region E6 corresponds to the other subregion which is an area of the second region E2 exclusive of the fifth region E5.

A hole 210 is positioned in the sixth region E6. For example, the hole 210 may be positioned at a corner of the sixth region E6 of the packaging body 1. As employed herein "positioning of the hole at a corner" refers to an absence of a corner resulting from the placement of the hole 210. The term "absence of a corner" encompasses, in addition to the removal of an originally existing corner of the packaging body 1, the packaging body 1 is free of any corners. This arrangement can increase the distance between the hole 210 and the negative-electrode terminal 3. Thus, this can reduce the tendency of the negative-electrode terminal 3 to short-circuit against the positive electrode 5 via the hole 210.

As shown in FIG. 8 or FIG. 9, the positive-electrode current collector 4 is quadrangular shaped, as seen in a direction perpendicular to the first plane P1. The positive-electrode current collector 4 includes a first corner S1 and a second corner S2 which is positioned on a diagonal line of the positive-electrode current collector 4 with respect to the first corner S1. The positive-electrode terminal 302 is positioned in the vicinity of the first corner S1. The second end of the positive-electrode terminal 302 is exposed out of the packaging body 1. A hole 310 is positioned in the vicinity of the second corner S2.

As shown in FIG. 8, given that the packaging body 1 is divided into four regions by an imaginary line passing through the midpoint of one specific side of the positive-electrode current collector 4 and an imaginary line passing through the midpoint of another side of the positive-electrode current collector 4 contiguous to the specific side, the term "the vicinity of the first corner S1" described above refers to the region including the first corner S1 where the positive-electrode terminal 302 is positioned, and, the term "the vicinity of the second corner S2" described above refers to the region including the second corner S2 where the hole 310 is positioned.

Thus, the hole 310 and the positive-electrode terminal 302 can be positioned on a diagonal line of the quadrangular positive-electrode current collector 4. This arrangement increases the distance between the hole 310 and the positive-electrode terminal 302, and thus reduces the tendency of the positive-electrode terminal 302 to short-circuit against the negative electrode 7 via the hole 310.

The negative-electrode current collector 6 is quadrangular shaped, as seen in a direction perpendicular to the second plane P2. The negative-electrode current collector 6 includes a third corner S3 and a fourth corner S4 which is positioned on a diagonal line of the negative-electrode current collector 6 with respect to the third corner S3. The negative-electrode terminal 303 is positioned in the vicinity of the third corner S3. The second end of the negative-electrode terminal 303 is exposed out of the packaging body 1. A hole 310 is positioned in the vicinity of the fourth corner S4.

As shown in FIG. 9, given that the packaging body 1 is divided into four regions by an imaginary line passing through the midpoint of one specific side of the negative-electrode current collector 6 and an imaginary line passing through the midpoint of another side of the negative-electrode current collector 6 intersecting with the one specific side, the term "the vicinity of the third corner S3" described above refers to a region including the third corner S3 where the negative-electrode terminal 303 is positioned, and, the term "the vicinity of the fourth corner S4" described above refers to a region including the fourth corner S4 where the hole 310 is positioned.

Thus, the hole 310 and the negative-electrode terminal 303 can be positioned on a diagonal line of the quadrangular negative-electrode current collector 6. This arrangement can increase the distance between the hole 310 and the negative-electrode terminal 303. Thus, this can reduce the tendency of the negative-electrode terminal 303 to short-circuit against the positive electrode 5 via the hole 310.

Figure 10:
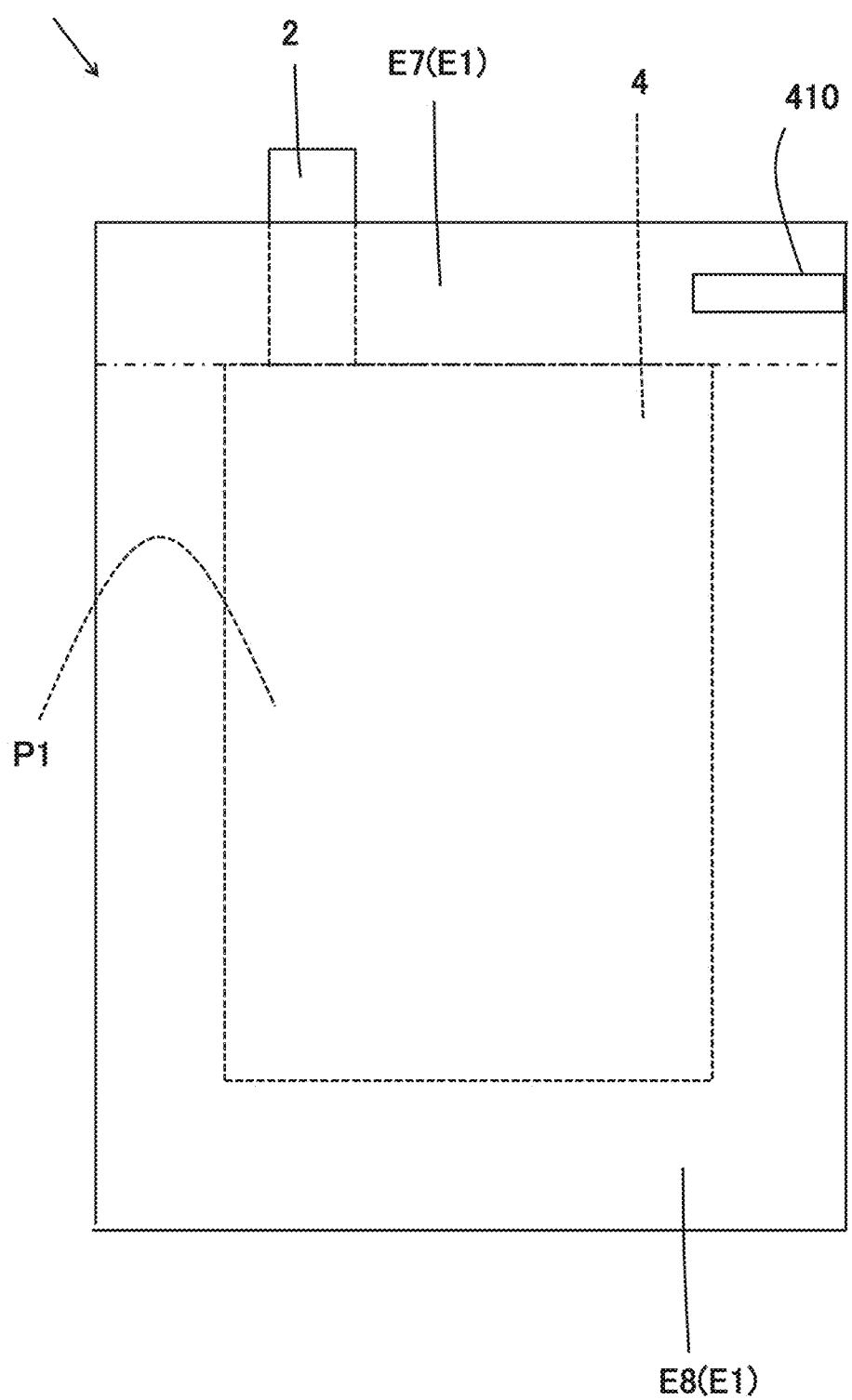
FIG. 10 is a top view of still another example of the electrochemical cell, as seen from the positive electrode.

As shown in FIG. 10, in an electrochemical cell X5, the positive-electrode current collector 4 is given a quadrangular shape including a first side L1, as seen in a direction perpendicular to the first plane P1. The first end of the positive-electrode terminal 2 is connected to the first side L1 within the packaging body 1. The second end of the positive-electrode terminal 2 is exposed out of the packaging body 1. The first region E1 of the packaging body 1 is divided, by a straight line extending from the first side L1, into a seventh region E7 from which the positive-electrode terminal 2 is exposed, and an eighth region E8 which is an other region than the seventh region E7.

A hole 410 is positioned in the seventh region E7. For example, the hole 410 may be positioned at a corner of the seventh region E7 of the quadrangular packaging body 1. In this case, the hole 410 can be brought nearer to the positive-electrode terminal 2 which is prone to gas generation, and this can facilitate an escape of gas to the outside. Thus, this can achieve further reduction in decreased battery capacity. Gas is generated more readily at and around the positive-electrode terminal 2, presumably because, for example, this region is more likely to undergo the passage of electric current.

Figure 11:
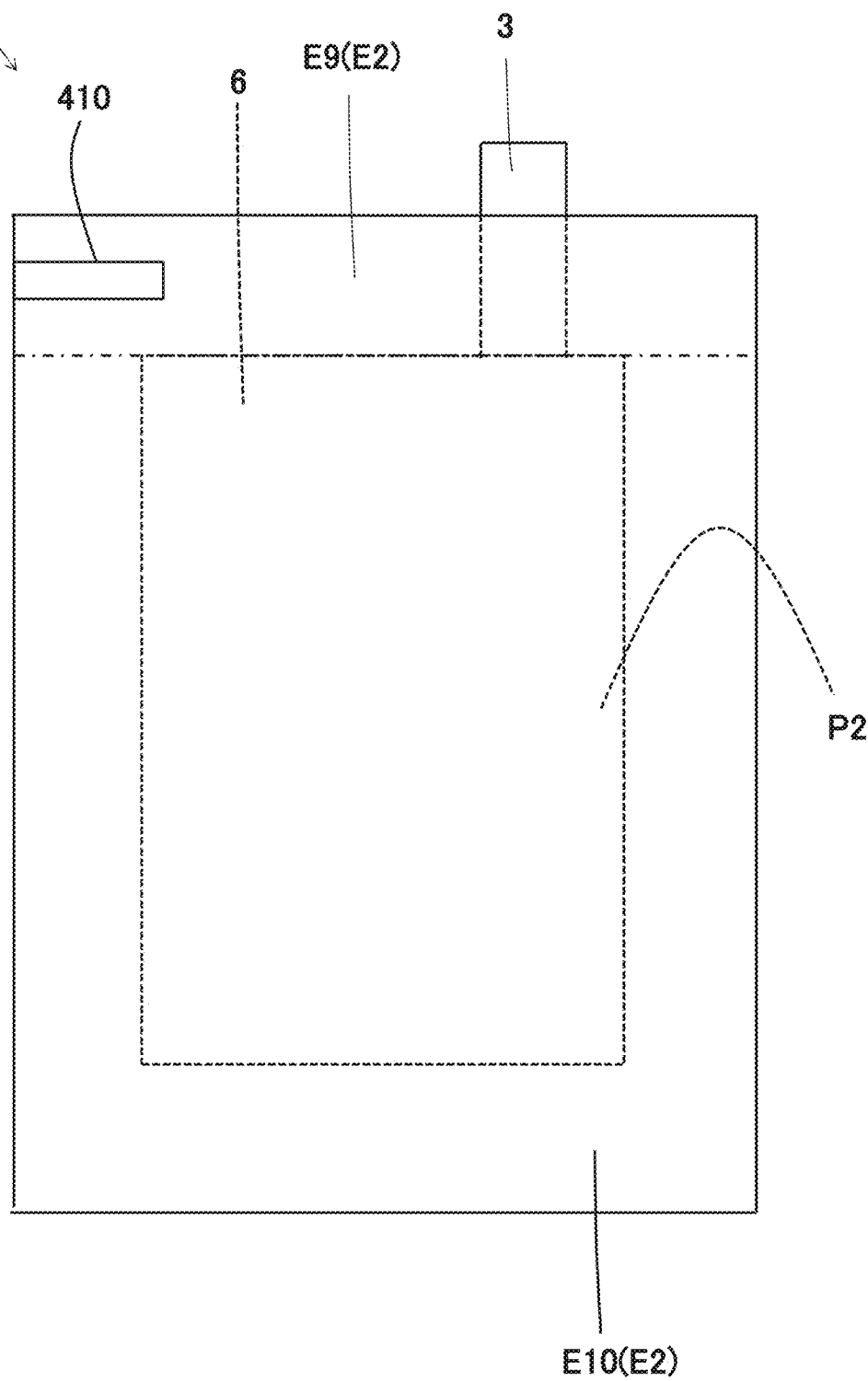
FIG. 11 is a top view of the example of the electrochemical cell, as seen from the negative electrode.

Moreover, as shown in FIG. 11, in the electrochemical cell X5, the negative-electrode current collector 6 is given a quadrangular shape including a second side L2, as seen in a direction perpendicular to the second plane P2. The first end of the negative-electrode terminal 3 is connected to the second side L2 within the packaging body 1. The second end of the negative-electrode terminal 3 is exposed out of the packaging body 1. The second region E2 of the packaging body 1 is divided, by a straight line extending from the second side L2, into a ninth region E9 from which the negative-electrode terminal 3 is exposed, and a tenth region E10 which is an other region than the ninth region E9.

A hole 410 is positioned in the ninth region E9. For example, the hole 410 may be positioned at a corner of the ninth region E9 of the quadrangular packaging body 1. In this case, the hole 410 can be brought nearer to the negative-electrode terminal 3 which is prone to gas generation, and this can facilitate an escape of gas to the outside. Thus, this can achieve further reduction in decreased battery capacity. Gas is generated more readily at and around the negative-electrode terminal 3, presumably because, for example, this region is more likely to undergo the passage of electric current.

Figure 12:
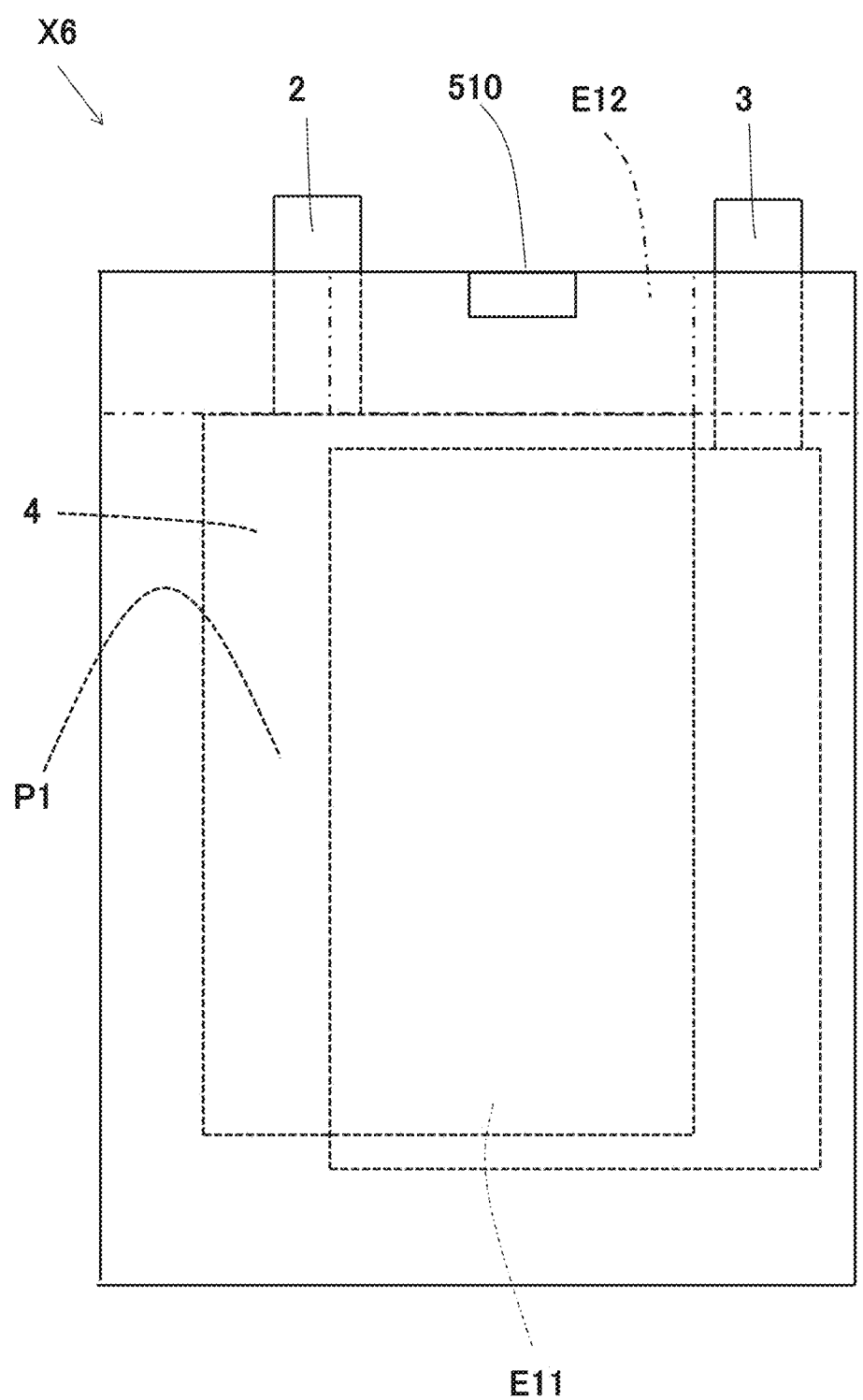
FIG. 12 is a top view of still another example of the electrochemical cell, as seen from the positive electrode.

As shown in FIG. 12, an electrochemical cell X6 includes an eleventh region E11 in which the first plane P1 of the positive-electrode current collector 4 and the second plane P2 of the negative-electrode current collector 6 overlap with each other, as seen in a direction perpendicular to the first plane P1. The packaging body 1 includes a twelfth region E12. The twelfth region E12 is a region in which an extension region of the eleventh region E11 extending toward the exposed portion of the positive-electrode terminal 2 and the seventh region E7 overlap with each other. A hole 510 is positioned in the twelfth region E12.

Figure 13:
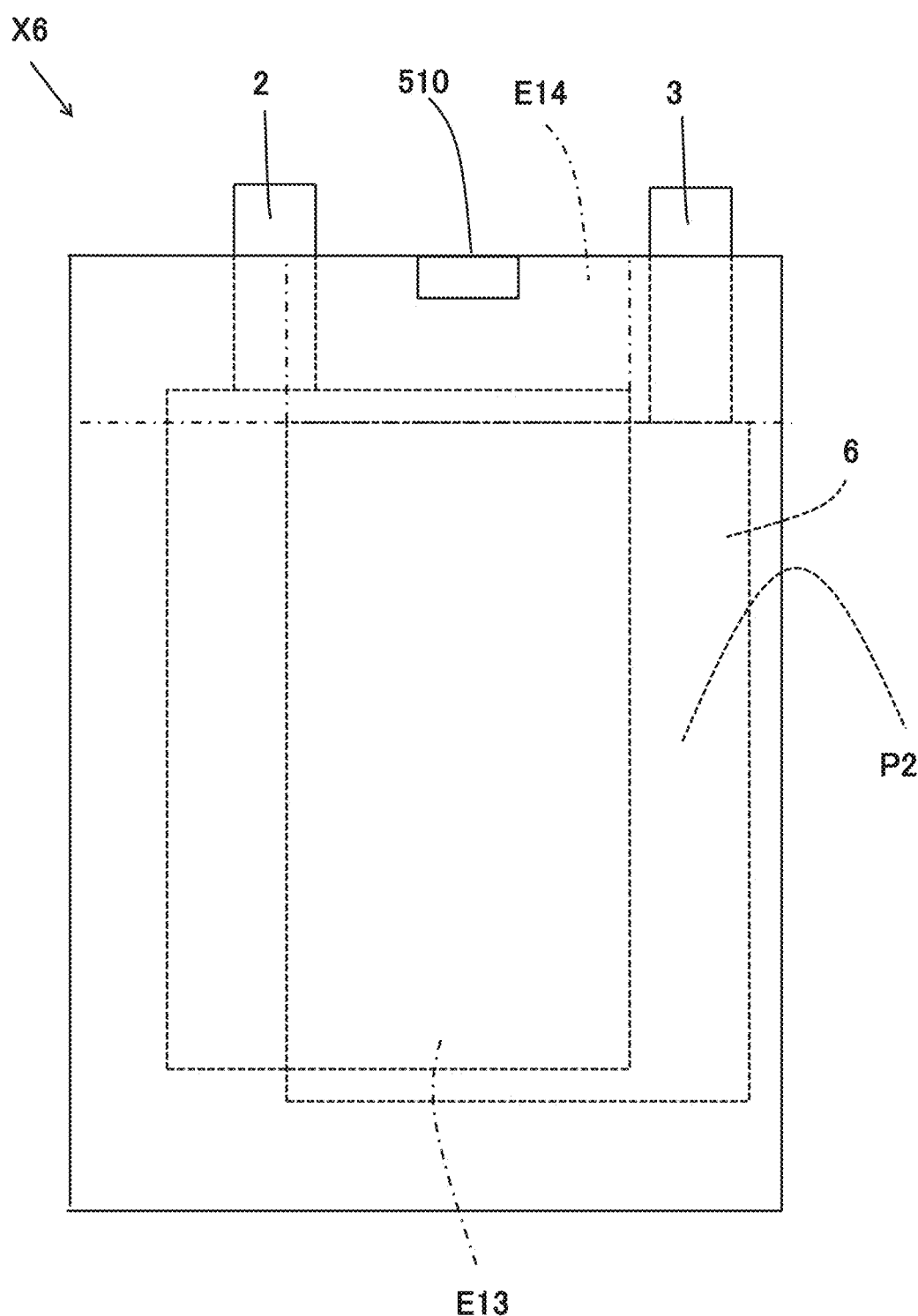
FIG. 13 is a top view of the example of the electrochemical cell, as seen from the negative electrode.

Moreover, as shown in FIG. 13, in the electrochemical cell X6, the negative-electrode current collector 6 includes a thirteenth region E13 in which the first plane P1 of the positive-electrode current collector 4 and the second plane P2 of the negative-electrode current collector 6 overlap with each other, as seen in a direction perpendicular to the second plane P1. The packaging body 1 includes a fourteenth region E14. The fourteenth region E14 is a region in which an extension region of the thirteenth region E13 extending toward the connected negative-electrode terminal 3 and the ninth region E9 overlap with each other. A hole 510 is positioned in the fourteenth region E14.

This arrangement can facilitate an escape of gas present around the gas generation-prone region where the positive-electrode current collector 4 and the negative-electrode current collector 6 overlap with each other. Thus, this can achieve further reduction in decreased battery capacity.

Figure 14:
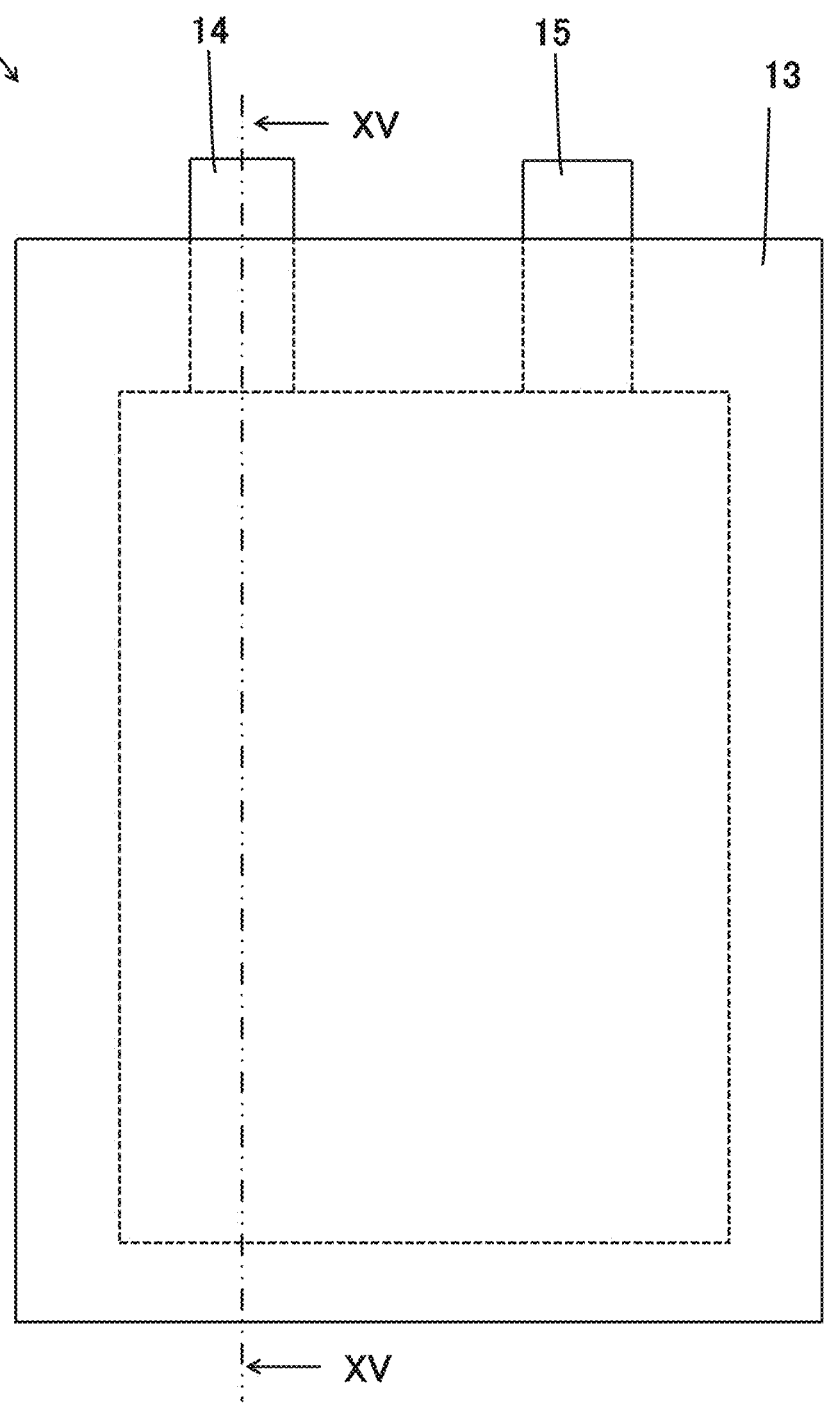
FIG. 14 is a top view of an example of the electrochemical cell stack, as seen from the positive electrode.
Figure 15:
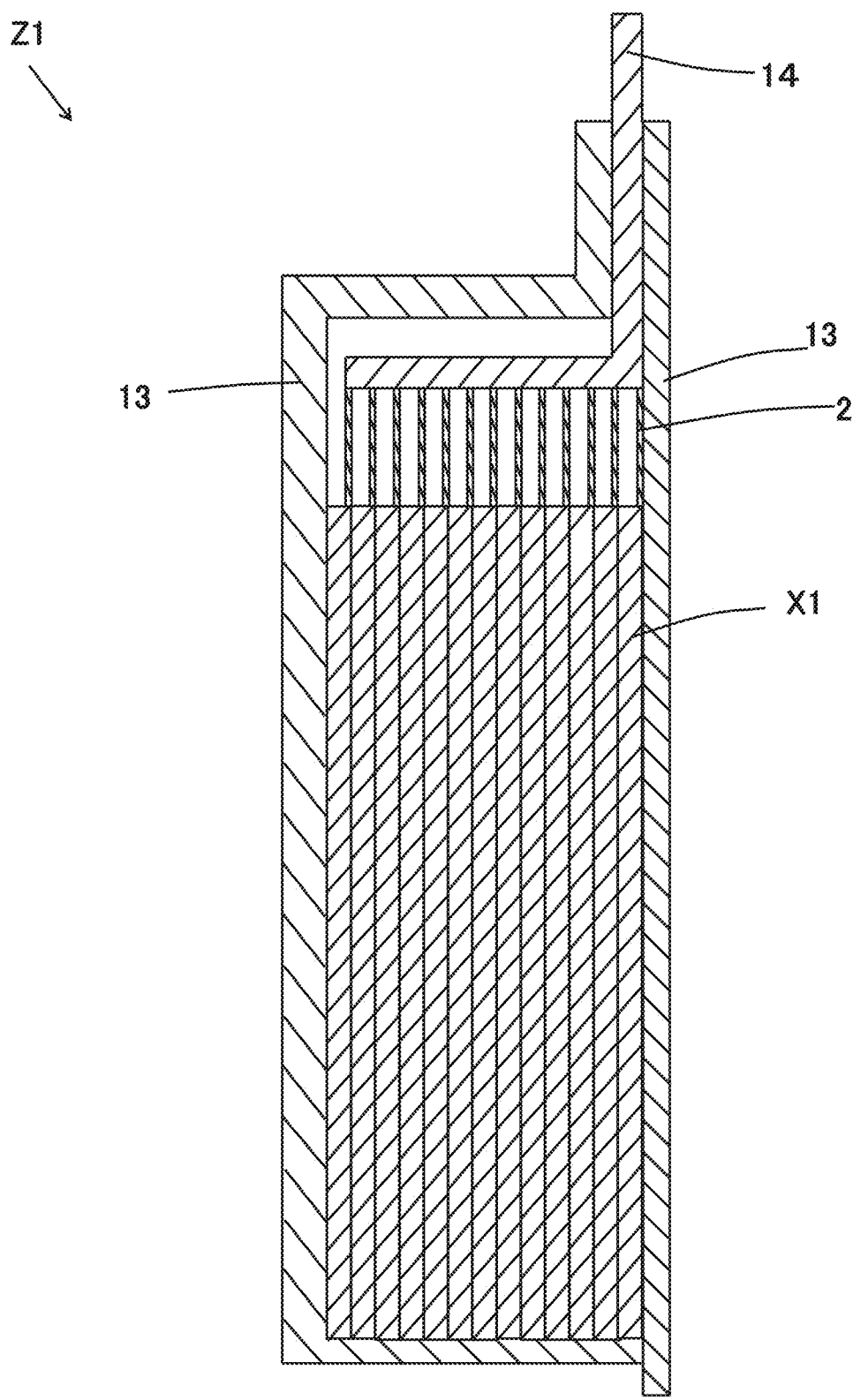
FIG. 15 is a sectional view taken along the line XV-XV in FIG. 14.

An electrochemical cell stack Z1 will now be described with reference to FIGS. 14 and 15. As shown in FIGS. 14 and 15, the electrochemical cell stack Z1 includes a plurality of electrochemical cells X1 received in a housing 13.

The housing 13 isolates the plurality of electrochemical cells X1 from the surrounding environment. This can reduce leakage of the substances constituting the positive electrode 5 or the negative electrode 7 from the plurality of electrochemical cells X1 to the surrounding environment. Also this can reduce infiltration of water and oxygen from the surrounding environment into the plurality of electrochemical cells X1. The housing 13 may be shaped in a rectangular prism, for example. Moreover, the housing 13 may be made of a metal material, for example. Examples of the metal material include stainless steel, aluminum, and copper. The housing 13 may contain an alloy of such metals as described above, or a combination of such metals as described above. The housing 13 is slightly larger in dimensions than the electrochemical cell X1.

Moreover, as shown in FIGS. 14 and 15, a positive-electrode terminal extension 14 connected to a plurality of positive-electrode terminals 2 and a negative-electrode terminal extension 15 connected to a plurality of negative-electrode terminals 3 provide electrical connection between an external apparatus and the plurality of electrochemical cells X1 received inside the housing 13. Moreover, the positive-electrode terminal extension 14 and the negative-electrode terminal extension 15 each include a first end and a second end. The first end of the positive-electrode terminal extension 14 is electrically connected to the plurality of positive-electrode terminals 2 within the housing 13, and, the first end of the negative-electrode terminal extension 15 is electrically connected to the plurality of negative-electrode terminals 3 within the housing 13. The second end of the positive-electrode terminal extension 14, as well as the second end of the negative-electrode terminal extension 15, is exposed out of the housing 13.

The invention claimed is:

1. An electrochemical cell, comprising:
   a power-generating element comprising
      a semi-solid positive electrode,
      a semi-solid negative electrode,
      a separator located between the semi-solid positive electrode and the semi-solid negative electrode,
      a positive-electrode current collector electrically connected to the semi-solid positive electrode, and
      a negative-electrode current collector electrically connected to the semi-solid negative electrode; and
   a packaging body which includes an inner space encasing the power-generating element, the packaging body comprising a plurality of holes, which connect the inner space of the packaging body to an outer space of the packaging body during a charging and discharging process of the power-generating element,
   wherein
   the plurality of holes are configured to allow gas generated by a side reaction occurring in the charging and discharging process to escape out of the packaging body through the plurality of holes, and wherein at least one of the plurality of holes is a cutout at an edge of the packaging body, the separator of the power-generating element divides the inner space of the packaging body into two separate chambers including a first chamber encasing the positive electrode and the positive-electrode current collector and a second chamber encasing the negative electrode and the negative-electrode current collector, the first chamber includes a first space between the positive electrode and the positive-electrode current collector, the second chamber includes a second space between the negative electrode and the negative-electrode current collector, the package body has a first packaging portion and a second packaging portion, the power-generating element being sandwiched between the first packaging portion and the second packaging portion in a thickness direction of the packaging body, and the plurality of holes includes:
  a first hole in the first packaging portion and covered by the second packaging portion in the thickness direction, the first hole connecting the first space of the first chamber to the outer space of the packaging body to allow gas generated by the positive electrode in the charging and discharging process to escape out of the first chamber through the first hole, and
  a second hole in the second packaging portion and covered by the first packaging portion in the thickness direction, the second hole connecting the second space of the second chamber to the outer space of the packaging body to allow gas generated by the negative electrode in the charging and discharging process to escape out of the second chamber through the second hole.

2. The electrochemical cell according to claim 1, wherein the positive-electrode current collector comprises a first plane opposed to the semi-solid positive electrode, the packaging body comprises a first region which does not overlap with the positive-electrode current collector, as seen in a direction perpendicular to the first plane, and the plurality of holes is positioned in the first region.

3. The electrochemical cell according to claim 2, further comprising:
a positive-electrode terminal electrically connected to the positive-electrode current collector,
wherein, when viewed in a direction perpendicular to the first plane,
  the positive-electrode current collector is given a quadrangular shape comprising a first side,
  the positive-electrode terminal comprises a first end and a second end, the first end being connected to the first side within the packaging body, the second end being exposed out of the packaging body,
  the first region is divided, by a straight line extending from a side opposite to the first side of the positive-electrode current collector, into a third region from which the positive-electrode terminal is exposed and a fourth region which is an other region than the third region, and
  the plurality of holes is positioned in the fourth region.

4. The electrochemical cell according to claim 2, further comprising:
a positive-electrode terminal electrically connected to the positive-electrode current collector, the positive-electrode terminal comprising a first end and a second end,
wherein, when viewed in a direction perpendicular to the first plane,
  the positive-electrode current collector is given a quadrangular shape comprising a first corner and a second corner which is positioned on a diagonal line of the positive-electrode current collector with respect to the first corner,
  in the positive-electrode terminal, the first end is connected to the positive-electrode current collector in a vicinity of the first corner within the packaging body, and the second end is exposed out of the packaging body, and
  the plurality of holes is positioned in a vicinity of the second corner.

5. The electrochemical cell according to claim 2, further comprising:
a positive-electrode terminal electrically connected to the positive-electrode current collector, the positive-electrode terminal comprising a first end and a second end,
wherein, when viewed in a direction perpendicular to the first plane,
  the positive-electrode current collector is given a quadrangular shape comprising a first side,
  in the positive-electrode terminal, the first end is connected to the first side within the packaging body, and the second end is exposed out of the packaging body,
  the first region is divided, by a straight line extending from the first side, into a seventh region from which the positive-electrode terminal is exposed and an eighth region which is an other region than the seventh region, and
  the plurality of holes is positioned in the seventh region.

6. The electrochemical cell according to claim 5,
wherein, when viewed in a direction perpendicular to the first plane,
  the negative-electrode current collector is given a quadrangular shape comprising a second plane,
  the positive-electrode current collector comprises an eleventh region in which the first plane and the second plane overlap with each other,
  the packaging body comprises a twelfth region in which an extension region of the eleventh region extending toward an exposed portion of the positive-electrode terminal and the seventh region overlap with each other, and
  the plurality of holes is positioned in the twelfth region.

7. The electrochemical cell according to claim 1, wherein the negative-electrode current collector comprises a second plane opposed to the semi-solid negative electrode, the packaging body comprises a second region which does not overlap with the negative-electrode current collector, as seen in a direction perpendicular to the second plane, and the plurality of holes is positioned in the second region.

8. The electrochemical cell according to claim 7, further comprising:
a negative-electrode terminal electrically connected to the negative-electrode current collector,
wherein, when viewed in a direction perpendicular to the second plane, the negative-electrode current collector is given a quadrangular shape comprising a second side,
the negative-electrode terminal comprises a first end and a second end, the first end being connected to the second side within the packaging body, the second end being exposed out of the packaging body,
the second region is divided, by a straight line extending from a side opposite to the second side of the negative-electrode current collector, into a fifth region from which the negative-electrode terminal is exposed and a sixth region which is an other region than the fifth region, and
the plurality of holes is positioned in the sixth region.

9. The electrochemical cell according to claim 7, further comprising:
a negative-electrode terminal electrically connected to the negative-electrode current collector, the negative-electrode terminal comprising a first end and a second end,
wherein, when viewed in a direction perpendicular to the second plane,
the negative-electrode current collector is given a quadrangular shape comprising a third corner and a fourth corner which is positioned on a diagonal line of the negative-electrode current collector with respect to the third corner,
in the negative-electrode terminal, the first end is connected to the negative-electrode current collector in a vicinity of the third corner within the packaging body, and the second end is exposed out of the packaging body, and
the plurality of holes is positioned in a vicinity of the fourth corner.

10. The electrochemical cell according to claim 7, further comprising:
a negative-electrode terminal electrically connected to the negative-electrode current collector, the negative-electrode terminal comprising a first end and a second end,
wherein, when viewed in a direction perpendicular to the second plane,
the negative-electrode current collector is given a quadrangular shape comprising a second side,
in the negative-electrode terminal, the first end is connected to the second side within the packaging body, and the second end is exposed out of the packaging body,
the second region is divided, by a straight line extending from the second side, into a ninth region from which the negative-electrode terminal is exposed and a tenth region which is an other region than the ninth region, and
the plurality of holes is positioned in the ninth region.

11. The electrochemical cell according to claim 10, wherein, when viewed in a direction perpendicular to the second plane,
the positive-electrode current collector is given a quadrangular shape comprising a first plane,
the negative-electrode current collector comprises a thirteenth region in which the first plane and the second plane overlap with each other,
the packaging body comprises a fourteenth region in which an extension region of the thirteenth region extending toward an exposed portion of the negative-electrode terminal and the ninth region overlap with each other, and
the plurality of holes is positioned in the fourteenth region.

12. The electrochemical cell according to claim 1, wherein
the first packaging portion covers the positive-electrode current collector,
the second packaging portion covers the negative-electrode current collector, and
the first packaging portion is separate from the second packaging portion and opposite to the second packaging portion in the thickness direction of the packaging body.

13. The electrochemical cell according to claim 12, wherein each of the plurality of holes does not pass through both the first packaging portion and the second packaging portion.

14. The electrochemical cell according to claim 1, wherein
the semi-solid positive electrode is configured to
receive electrons from the positive-electrode current collector during a discharging process, and
release the electrons to the positive-electrode current collector during a charging process.

15. The electrochemical cell according to claim 1, wherein
the semi-solid negative electrode is configured to
release electrons to the negative-electrode current collector during discharging process, and
receive the electrons from the negative-electrode current collector during charging process.

16. The electrochemical cell according to claim 1, wherein each of the plurality of holes connects the inner space of the packaging body to the outer space of the packaging at all times to allow the gas generated by the side reaction occurring during the charging and discharging process of the power-generating element to escape out of the packaging body.

17. An electrochemical cell stack, comprising:
a plurality of electrochemical cells including the electrochemical cell according to claim 1.

* * * * *